United States Patent [19]

Smith

[11] Patent Number: 5,795,998
[45] Date of Patent: Aug. 18, 1998

[54] FLOW SENSOR AND FUEL CONTROL SYSTEM

[75] Inventor: Trevor Stanley Smith, Sutton Coldfield, England

[73] Assignee: Lucas Industries Public Limited Company, Solihull, England

[21] Appl. No.: 760,820

[22] Filed: Dec. 5, 1996

[30] Foreign Application Priority Data

Dec. 12, 1995 [GB] United Kingdom ............... 9525370

[51] Int. Cl.⁶ ........................................... G01F 01/22
[52] U.S. Cl. ............................ 73/118.1; 73/119 A
[58] Field of Search .......................... 73/116, 117.2, 73/117.3, 118.1, 118.2, 119 A, 861.53, 861.54, 861.55

[56] References Cited

U.S. PATENT DOCUMENTS

| | | | |
|---|---|---|---|
| 4,304,136 | 12/1981 | McCabe et al. | 73/861.54 |
| 4,366,718 | 1/1983 | Nelson | 73/861.58 |
| 4,459,860 | 7/1984 | Walters | 73/861.55 |
| 4,507,976 | 4/1985 | Banko | 73/861.54 |
| 4,619,146 | 10/1986 | Teodorescu et al. | 73/861.54 |
| 5,377,538 | 1/1995 | Cardinal | 73/118.2 |
| 5,408,872 | 4/1995 | Nonaka | 73/118.2 |
| 5,562,076 | 10/1996 | Madl | 73/118.2 |

FOREIGN PATENT DOCUMENTS

| | | |
|---|---|---|
| 0180248 B1 | 10/1983 | United Kingdom . |
| PCT/CA/93/00248 | 6/1993 | WIPO . |

*Primary Examiner*—George M. Dombroske
*Attorney, Agent, or Firm*—Trexler, Bushnell, Giangiorgi & Blackstone, Ltd.

[57] ABSTRACT

Disclosed is a flow sensor comprising a cylinder and a piston movable within the cylinder and dividing the cylinder into first and second chambers. The first chamber communicates with an inlet and the cylinder has an orifice which cooperates with the piston to define an outlet from the first chamber. The area of the orifice varies with the position of the piston within the cylinder. The apparatus operates to vary the pressure in the second chamber so as to move the piston in response to fluid flow to maintain a substantially constant pressure drop between the inlet and outlet, each unique axial position of the piston within the cylinder indicating a particular flow rate. A transducer senses the position of the piston and thus the direction and rate of flow.

14 Claims, 5 Drawing Sheets

1

FLOW SENSOR AND FUEL CONTROL SYSTEM

BACKGROUND AND SUMMARY

The present invention relates to a flow sensor for sensing the rate of flow of a fluid, such as fuel in a fuel control system. The invention also relates to a fuel control system, for instance for a gas turbine engine, incorporating such a flow sensor.

Published International Patent Specification No. WO93/25868 discloses a flow transducer comprising a cylindrical body and a piston which is movable with the body. The body has an inlet and an orifice which cooperates with the piston to define an outlet from the body, the area of the orifice varying with the position of the piston within the body. Movement of the piston in both directions is opposed by a spring.

The sensor is placed in a conduit. Upon flow of fluid through the conduit, the piston moves to a position in which the pressure differential across the orifice is balanced by the force of the spring. However, as the piston moves, the area of the orifice also varies so that the range of pressure differentials across the piston over the range of flows will be less than would be experienced with a fixed orifice. Thus, the piston assumes a unique position for each flow rate. The position of the piston is sensed to provide a signal indicative of flow rate.

However, it is an object of the present invention to provide a flow sensor having greater accuracy, and having a sufficiently high hydro-mechanical position loop gain so as to give a faster response at all flow levels without the gain being too high for stability.

According to a first aspect of the invention, there is provided a flow sensor comprising:

a cylinder;

a piston movable within the cylinder and dividing the cylinder into first and second chambers, the first chamber communicating with an inlet, the cylinder having an orifice which cooperates with the piston to define an outlet from the first chamber whose area varies with the position of the piston within the cylinder, the piston being biased so as to tend to close the outlet; a pressure varying arrangement for varying the pressure in the second chamber so as to move the piston to maintain a substantially constant pressure drop between the inlet and the outlet; and a transducer for supplying a signal representing the position of the piston within the cylinder.

The pressure varying means may comprise a valve arrangement disposed within the piston. The valve arrangement may comprise a further piston movable within the piston and separating the first chamber from a third chamber within the piston, means for biassing the further piston towards the first chamber, a first duct connecting the third chamber to the outlet, a valve connecting the third chamber to the second chamber and arranged to close when the further piston moves towards the first chamber, and an orifice connecting the inlet to the second chamber.

The cylinder may have at least one further orifice which cooperates with the piston to define at least one further outlet from the first chamber whose area varies with the axial and rotary positions of the piston within the cylinder. An actuator, such as a stepper motor or a torque motor, may be provided for rotating the piston with respect to the cylinder.

Means may be provided for equalising the pressure drop across the outlet and the or each further outlet.

The or each biassing means may comprise a spring, such as a compression spring.

The transducer may comprise a linear variable displacement transducer responsive to the axial position of the piston with respect to the cylinder.

According to a second aspect of the invention, there is provided a fuel control system including a sensor according to the first aspect of the invention.

The system may comprise a variable rate pump, such as a variable displacement pump, arranged to supply fuel via the sensor. The system may comprise a controller having an input connected to the sensor and an output connected to the pump for providing servo control of fuel flow. A pressure raising and shut-off valve may be disposed between the pump and the sensor.

BRIEF DESCRIPTION OF THE DRAWINGS

The invention will be further described, by way of example, with reference to the accompanying drawings, in which.

Like reference numerals refer to like parts throughout the drawings.

DESCRIPTION

Figure 1:
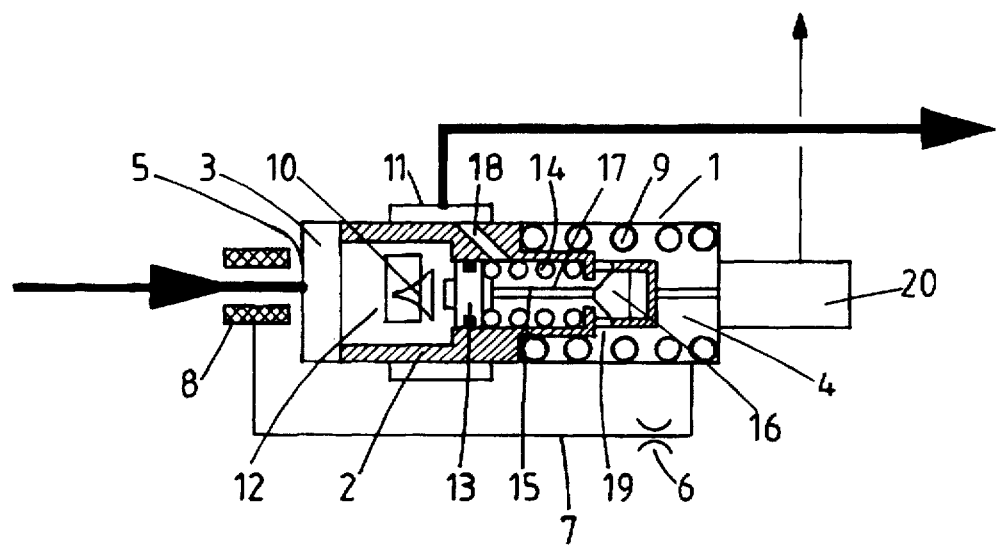
FIG. 1 is a diagrammatic cross-sectional view of a flow sensor constituting a first embodiment of the invention.

The flow sensor shown in FIG. 1 comprises a cylinder 1 containing an axially movable servo piston 2 which divides the cylinder into a first chamber 3 and a second servo pressure chamber 4. The first chamber 3 has an inlet 5 forming an inlet of the flow sensor for receiving fluid flow, for instance of liquid fuel.

The servo pressure chamber 4 has an inlet which is connected via a servo feed orifice 6 and a duct 7 to receive fuel from the inlet flow via a filter 8. The orifice 6 may comprise a restriction in the duct 7 and supplies fuel to the servo pressure chamber 4. The chamber 4 contains a servo spring 9 which urges the piston 2 to the left as shown in FIG. 1.

The cylinder 1 has a meter profile 10 which communicates with an outlet 11 for output fuel flow from the sensor. The meter profile 10 has a lateral width which increases exponentially with axial position towards the right as shown in FIG. 1. The servo piston 2 has an opening 12 of rectangular shape which varies the outlet area from the chamber 3 as the piston 2 moves axially within the cylinder 1. Alternatively, the opening 12 may be replaced by a straight metering edge.

The piston 2 contains a coaxially disposed pressure drop piston 13 which is biassed to the left by a spring 14. The piston 13 has a stem 15 which carries a servo control poppet 16 forming a poppet valve with its seat. The piston 13 is movable axially within a chamber 17 within the piston 2. A duct 18 is formed within the piston 2 so as to provide fluid communication between the outlet 11 and the chamber 17. Passages 19 are provided in the piston 2 so as to permit communication between the chamber 4 and the orifice formed by the gap between the poppet 16 and its seat. Communication between the chamber 4 and the chamber 17, and hence the outlet 11, is controlled by opening between the poppet 16 and its seat i.e. the relative positions of the piston 2 and the piston 13.

In the absence of flow through the sensor, there is no pressure drop across the metering profile 10 so that the pressure in the chamber 17 is the same as that in the chamber 3. The spring 14 urges the piston 13 to the left as shown in FIG. 1 and the poppet valve closes. Thus, there is no servo flow out of the chamber 4 into the chamber 17. The spring 9 urges the piston 2 to the left as shown in FIG. 1 so that the pressure in the chamber 4 is lower than that in the chamber 3 and there is a servo flow through the orifice 6 into the chamber 4. This servo flow allows the piston 2 to move to the left as shown in FIG. 1, thus closing the meter profile 10.

When fluid flows through the sensor, a pressure drop is created across the meter profile 10 between the chamber 3 and the outlet 11. This pressure drop is sensed by the piston 13. If the pressure drop exceeds a reference value determined by the spring 14, the piston 13 moves to the right as shown in FIG. 1 causing the opening between the poppet 16 and its seat to increase. This causes the servo flow out of the chamber 4 through the poppet valve to exceed the flow into the chamber 4 through the orifice 6. The servo pressure in the chamber 4 falls so that the pressure in the chamber 3 pushes the piston 2 to the right as shown in FIG. 1 against the spring 9. This opens the meter profile 10, causing the pressure drop across the profile 10 to decrease until the load due to the metering pressure drop acting on the piston 13 falls to the datum set by the load in the spring 14. The piston 13 then moves to the left relative to the piston 2 causing the opening between the poppet 16 and its seat to decrease until the servo flow out of the chamber 4 through the poppet valve matches the flow into the chamber 4 through the orifice 6. This stops rightward movement of the piston 2, thus preventing further opening of the meter profile 10.

If flow through the sensor decreases, the pressure drop across the meter profile 10 decreases so that the spring 14 moves the piston 13 to the left, thus reducing the opening of the poppet valve. The servo flow out of the chamber 4 through the poppet valve falls below the flow into the chamber 4 through the orifice 6. The pressure in the chamber 4 rises and the piston 2 moves to the left so as to reduce the opening of the meter profile 10. This causes the metering pressure drop across the meter profile 10 to increase until it balances the reference value set by the spring 14. The poppet valve then opens to restore the balance between the flow into and out of the chamber 4 so that movement of the piston 2 stops.

Thus, a constant pressure is maintained between the inlet 5 and the outlet 11 by varying the size of the metering profile defined between the meter profile 10 and the opening 12. The area of this metering profile is proportional to the rate of fluid flow through the sensor so that the position of the servo piston 2 represents a measure of the rate of flow. A transducer 20 is connected to the piston 2 and supplies a signal representing the position of the piston and hence of the rate of fuel flow through the sensor. The transducer 20 may, for instance, comprise a linear voltage differential transformer.

Figure 2:
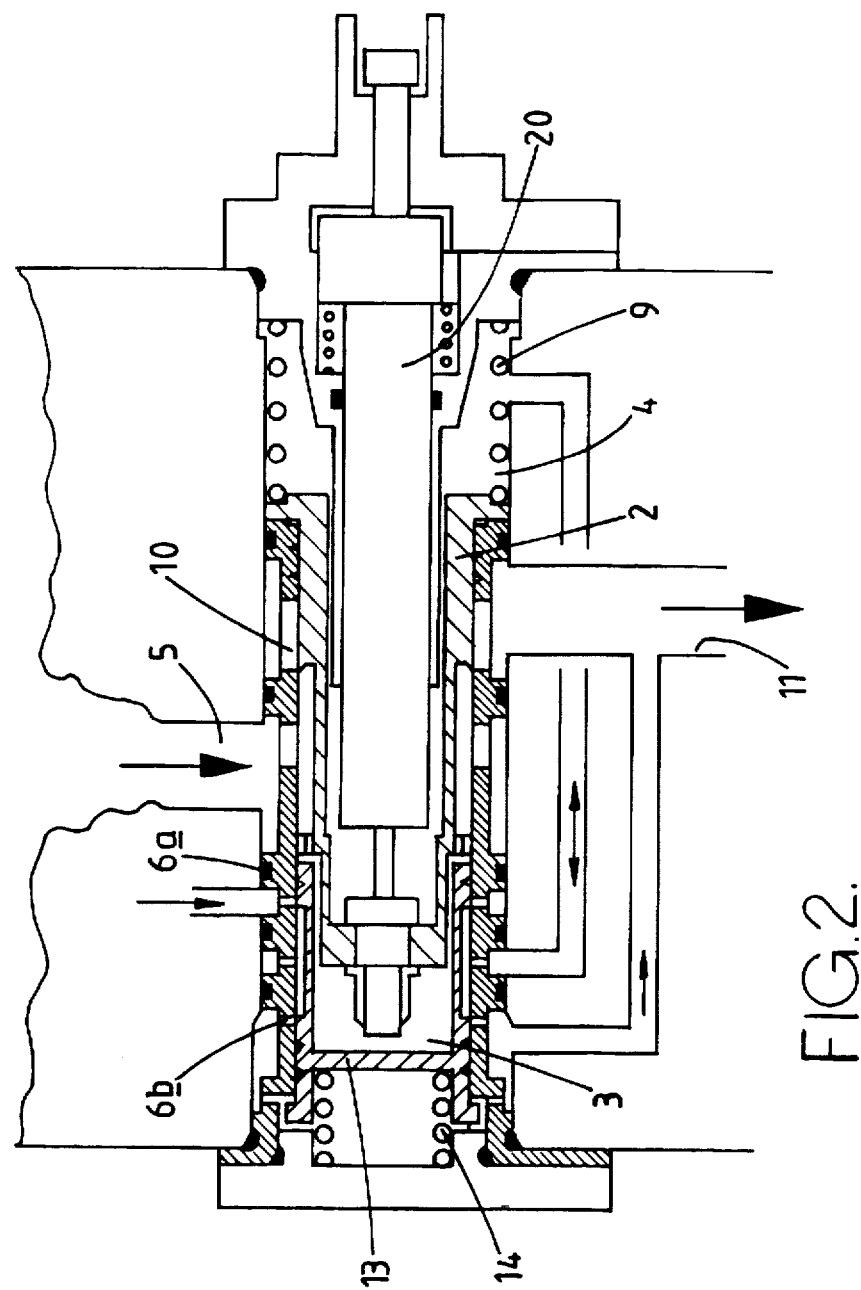
FIG. 2 is a diagrammatic cross-sectional view of a flow sensor constituting a second embodiment of the invention.

Referring to FIG. 2 of the drawings, a second embodiment of the present invention is shown, which is particularly suitable for small flow applications. As illustrated, the position sensor 20 is located inside the piston 2. Therefore, the pressure drop piston 13 is located adjacent the servo piston 2. Operation of the flow sensor of the second embodiment of the present invention is substantially the same as that described for the first embodiment above.

The valve is intended for use in measuring flows over a range of 120 pph to 4000 pph at a constant pressure drop of around 75 psi. It is to be recognised however that it will operate at lower flow rates but with reduced accuracy. The flow, which again may conveniently be liquid fuel, enters the valve by way of the inlet 5 which is disposed generally centrally of the length of the valve. Fuel entering through inlet 5 can leave the valve by way of the metering profile, the flow area of which is controlled by the position of the servo piston. A pressure drop piston 13 disposed at the left hand end of the valve as drawn in FIG. 2, senses the pressure drop across the metering profile 10 and controls the servo flow to the servo piston 2 so that it moves to achieve a constant metering profile pressure drop of a predetermined value (75 psi in the example mentioned above). It can be seen therefore that the position of the servo piston 2 is a function of the metered flow as controlled by the metering profile 10. The transducer 20 which, as described above, can be a linear voltage differential transformer senses the position of the servo piston 2, and thus the flow.

The servo piston 2 is a single diameter valve the servo force being generated by servo pressure in the chamber 4, in conjunction with the servo piston return spring 9 acting on the right hand end of the piston and inlet pressure acting on the left hand end of the piston, inlet pressure reaching the left hand end of the piston by way a central gallery, and small axial apertures in a land of the piston 2.

The pressure drop piston 13 is also a single diameter valve running in the same bore of the valve body as the servo piston 2. Inlet pressure acts on the right hand end of the pressure drop piston 13 and this is balanced by the fluid pressure conditions downstream of the flow sensing valve and the pressure drop spring 14 both of which act on the left hand end of the pressure drop piston 13.

Should a change occur in the pressure drop across the metering profile 10 then this will cause a change in the pressure at the left hand end of the pressure drop piston 13 with consequential movement of the piston 13 so creating a servo flow to or from the chamber 4, and thus the right hand end of the servo piston 2, by opening either a servo orifice 6a supplied from the inlet 5 by way of a flow wash filter, or a servo orifice 6b supplied from the pressure downstream of the flow sensing valve. The servo flow generated in this way moves the servo piston 2 in the appropriate direction to restore the correct pressure drop.

The servo flow return from the chamber 4 is routed by way of orifice 6b into the downstream flow from the valve and thus becomes part of the flow calibration of the valve. The steady state servo flow is virtually zero, there being no flow in the central position of the piston 13 as both servo orifices are closed by the piston 13 in its central position. Such an arrangement ensures a very low quiescent servo flow affording only insignificant calibration errors. Moreover, it enables the valve to operate at very low flow rates. The arrangement described in relation to FIG. 2 is advantageous in that there is a substantially constant pressure drop across the metering profile 10, thus providing more accurate control of the flow sensing valve particularly in an arrangement as shown in FIG. 2 which has a simple single diameter servo valve, and also providing a more constant dynamic response across the intended operating flow range.

The valve will be chosen to have a diameter which is relatively large in relation to the maximum metered flow so as to ensure the generation of adequate servo forces with a relatively low servo supply pressure drop. Such an arrangement enables the sensor 20 to be placed inside the servo piston 2 thereby keeping the overall length of the valve relatively small. Desirably where the sensor is a linear voltage differential transformer it will be a dual lane device.

Figure 3:
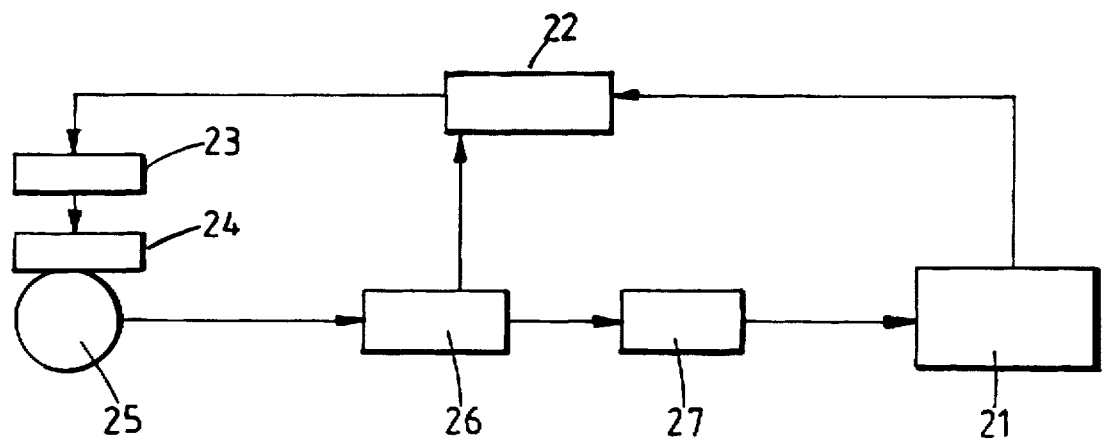
FIG. 3 is a schematic diagram of a fuel control system including the sensor of FIG. 1.

FIG. 3 illustrates a fuel control system for a gas turbine engine 21, for instance for use in an aircraft. The engine contains various sensors which supply signals to an electronic engine control unit 22. Pilot demand signals are also supplied to the control unit 22. The control unit 22 has an output which controls a motor 23 associated with a servo 24 and a variable displacement pump 25. The output of the pump 25 passes through the flow sensor 26 as shown in FIG. 1 and to a pressure raising and shut off valve 27. The fuel then passes to the burners of the engine 21.

The output of the flow sensor 26 is connected to the control unit 22 to form a fast inner flow demand loop providing servo-control of the pump 25. In particular, the control unit provides a flow rate demand and compares this with the flow rate measured by the flow sensor 26. The control unit 22 then controls the pump 25 via the motor 23 and the servo 24 in accordance with the error between the actual and demanded flow rates so as to reduce the error substantially to zero and establish the demanded fuel flow rate.

Figure 4:
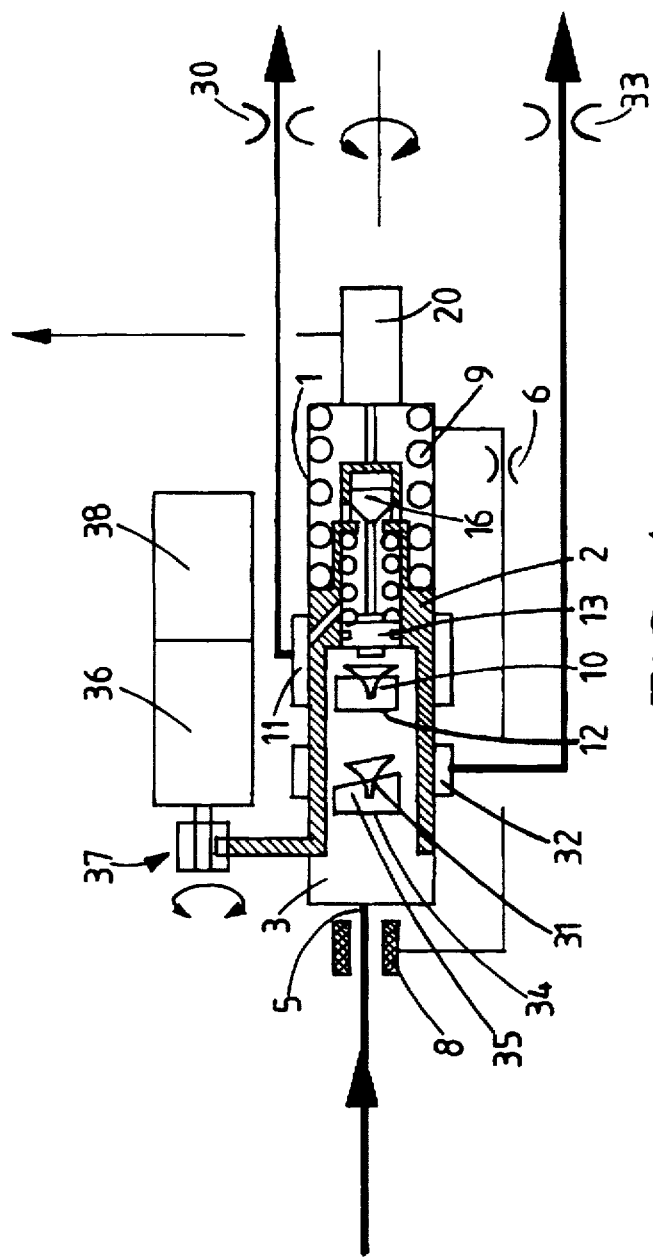
FIG. 4 is a diagrammatic cross-sectional view of a flow sensor constituting a third embodiment of the invention.

FIG. 4 illustrates a combined flow sensor and staging valve for measuring the rate of flow of fuel and for controlling the fuel split between pilot and main burners. The sensor and valve shown in FIG. 3 differs from the sensor shown in FIG. 1 as follows.

The meter profile 10 constitutes a pilot profile which measures the rate of fuel flow to pilot burners 30 of a gas turbine engine. The cylinder 1 further comprises a main meter profile 31 communicating with a further outlet 32 which is connected to main burners 33 of the gas turbine engine. The piston 2 has formed therein a further opening 34 of generally trapezoidal shape with an inclined edge 35 which cooperates with the main profile 31.

The piston 2 is mounted for rotation in the cylinder 1 and its rotary position is controlled by a motor 36 via a transmission 37. The rotary position of the motor 36, and hence of the piston 2, is determined by a rotary position transducer 38.

In use, the flow sensor operates as described with reference to FIG. 1. The pressure drop piston 13 senses the pressure drop across the pilot profile 10 and controls the axial position of the piston as a function of the pilot flow. At a given pilot flow, the axial position maybe independent of the rotary position or may also be a function of rotary position, depending on the shape of the opening 12. Thus, the rate of fuel flow to the pilot burners 30 is measured by the sensor. However, the variable orifice formed by the main profile 31 and the edge 35 of the opening 34 controls the flow of fuel to the main burners 33. The shapes of the profiles 10 and 31 and of the openings 12 and 34 are such that, for each rotary and axial position of the piston 2, fuel is supplied in a predetermined ratio to the pilot burners 30 and the main burners 33. However, by rotating the piston 2 within the cylinder 1, this ratio can be varied so as to control the split of fuel between the pilot burners 30 and the main burners 33. The ratio of the split with respect to the rotary position of the piston 2 is known for each axial position. The sensor supplies a signal or signals indicating directly the rate of fuel flow to the pilot burners 30 so that, from this signal and from the position signal supplied by the transducer 38, the rate of fuel flow to the main burners 33 can readily be calculated.

The motor 36 may comprise a stepper motor which provides "fail freeze" control of the fuel split between the pilot and main burners i.e. in the event of a failure, the rotary position of the piston 2 and hence the fuel split will remain fixed. Alternatively, the piston 2 may be rotated by a separate servo piston controlled by a torque-motor. In this latter case, "fail up" or "fail down" control of the fuel split may be provided, i.e. in the event of a failure, the piston 2 will return to one of its rotary end positions.

A throttle valve may be disposed downstream of the sensor between the further outlet 32 and the main burners 33 for equalising the pressure drop across the pilot and main meter profiles 10 and 31. Such an arrangement permits accurate measurement of the total fuel flow to be provided.

Figure 5:
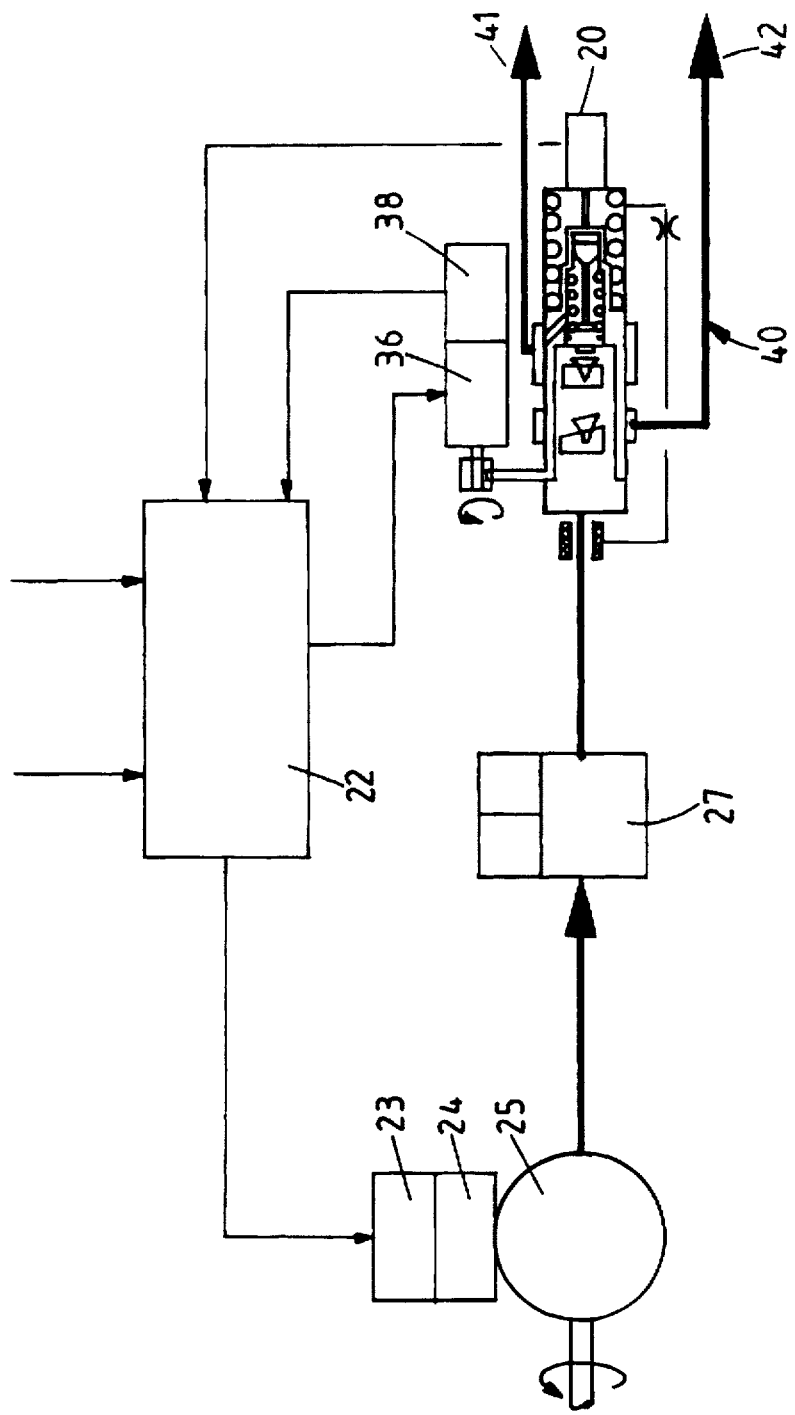
FIG. 5 is a schematic diagram of a fuel control system including the sensor of FIG. 4.

FIG. 5 illustrates a fuel control system of the type shown in FIG. 2 but including the combined flow sensor and staging valve 40 shown in FIG. 3. The control unit 22 comprises a smart electronic module which receives signals representing the main/pilot ratio demand and the flow demand signals. The position sensors 20 and 38 are connected to the module 22 so as to supply a pilot flow signal and a main/pilot ratio signal. The module 22 calculates the total fuel flow required to the pilot manifold 41 and the main manifold 42 and controls the pump 25 via the motor 23 and the servo 24. The pressure raising and shut off valve 27 is disposed between the pump 25 and the combined flow sensor and staging valve 40 so that only a single valve 27 is required. However, the valve 27 could be omitted and separate pressure raising and shut off valves could be provided in the fuel lines to the pilot and main manifolds 41 and 42.

The module 22 controls the motor 36 so as to rotate the piston 2 within the cylinder 1. The rotary position of the piston as sensed by the position transducer 38 is compared with the desired main/pilot ratio demand and the rotary position of the piston 2 is set so as to provide that ratio.

Figure 6:
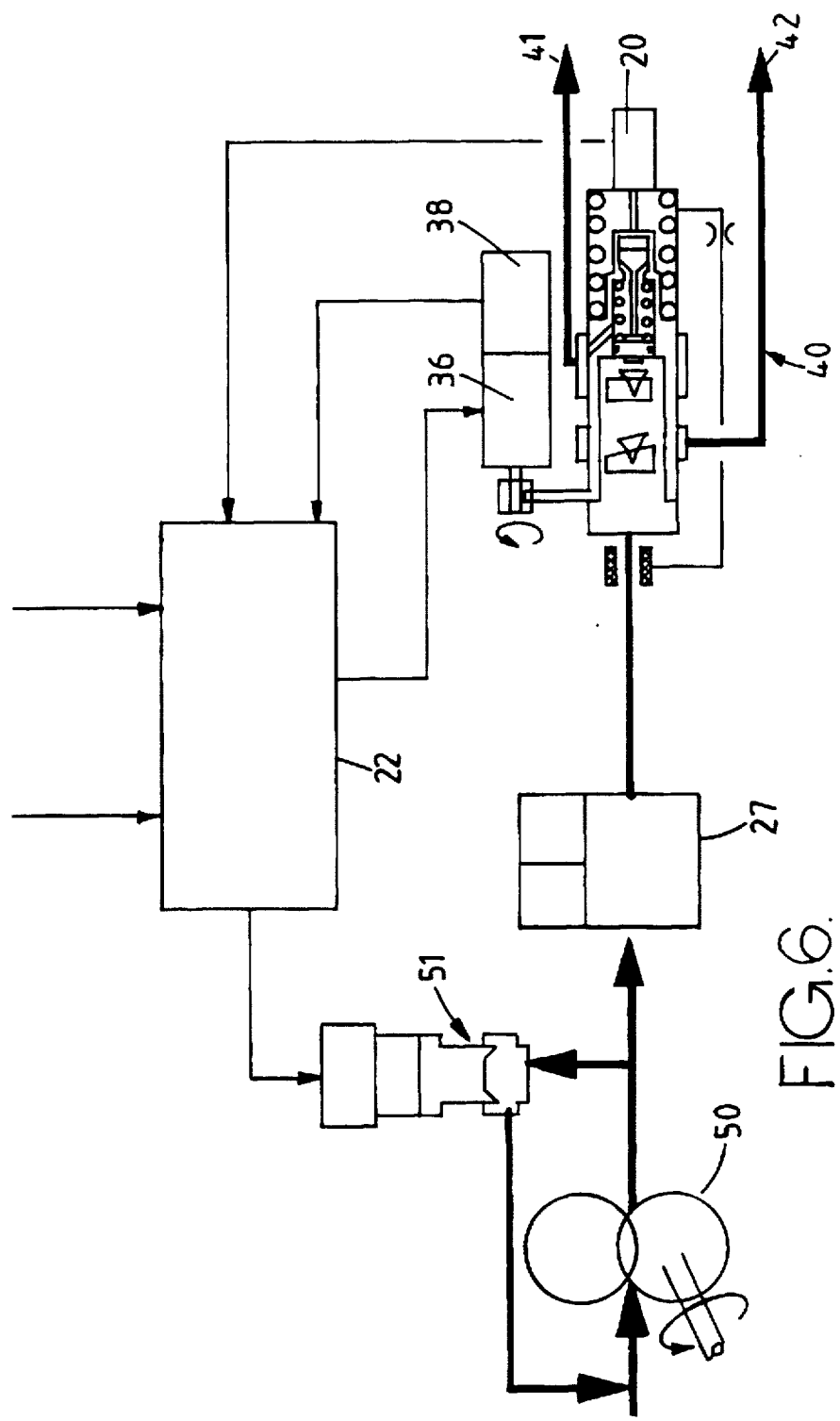
FIG. 6 is a schematic diagram of another fuel control system including the sensor of FIG. 4.

The flow control system shown in FIG. 6 differs from that shown in FIG. 5 in that the motor controlled variable displacement pump 25 is replaced by a conventional gear pump 50 driven by the engine. A motor-controlled spill valve 51 is provided for spilling excess fuel from the outlet of the pump 50 to the inlet. The valve 51 is controlled by the module 22 in accordance with the flow rate measured by the flow sensor and valve 40 such that the fuel spilled by the valve 51 results in the demanded fuel flow being supplied by the pump 50.

The flow sensors described hereinbefore have various advantages. Thus, the servo-supply pressure drop provided by the orifice 6 is constant and relatively low. This allows a sufficiently high hydro-mechanical position loop gain so as to give a fast response at all flow levels without the gain being too high for stability. Further, the gain does not increase with system pressure.

Returning the servo-pressure to the downstream pressure via the duct 18 allows the pressure drop piston 13 to be located inside the servo-piston 2. This provides a compact design.

The servo-pressure drop is always the same at a given flow regardless of system pressure levels. Thus, there are no error terms due to system pressure variations. Further, there are no parasitic servo flow losses.

The sensor is based on a similar construction to pressure drop spill valves, as described in published European Patent Specification No. 0 180 248. which have been found to be very reliable in use.

Using an exponential meter profile 10 allows good accuracy to be achieved over a wide flow range. Further, the exponential profile results in a constant hydro-mechanical position loop gain.

The piston 2 is always in the same position at a given flow rate so that errors in pressure drop caused by the servo spring load can be calibrated out. The servo spring 9 may therefore have a high load so as to give adequate servo return force without the need for differential servo area. The servo piston 2 may therefore be a single diameter piston which simplifies construction.

In order to provide temperature compensation, bimetal discs may be located within the pressure drop piston 1 3. Alternatively, use may be made of differential expansion between an aluminium cylinder 1 and steel valve 2.

Suitable shaping of the main profile 31 allows the maximum and minimum flow split ratio to be controlled, for instance so as to be functions of the pilot flow. It is thus possible to provide safe flame-out and over temperature limits on the split ratio for all flow conditions.

The main profile 31 and the opening 34 may be replaced by two main profiles and two corresponding openings. This allows control of the fuel flow split between, for instance, first and second stages of a main manifold.

I claim:
1. A flow sensor comprising:

a cylinder;

a first piston movable within the cylinder and dividing the cylinder into first and second chambers, the first chamber communicating with an inlet, the cylinder having an orifice which cooperates with the first piston to define an outlet from the first chamber whose area varies with the position of the first piston within the cylinder, the first piston being biased so as to tend to close the outlet;

a pressure varying arrangement for varying the pressure in the second chamber so as to move the first piston to maintain a substantially constant pressure drop between the inlet and the outlet; and a transducer for supplying a signal representing the position of the first piston within the cylinder.

2. A flow sensor according to claim 1, wherein the pressure varying arrangement comprises a valve arrangement disposed within the first piston.

3. A flow sensor according to claim 2, wherein the valve arrangement comprises a second piston movable within the first piston and separating the first chamber from a third chamber within the first piston, the second piston being biased towards the first chamber, a first dust connecting the third chamber to the second chamber and arranged to close when the second piston moves towards the first chamber, and an orifice connecting the inlet to the second chamber.

4. A flow sensor according to claim 1, wherein the pressure varying arrangement comprises a valve arrangement disposed adjacent the first piston.

5. A flow sensor according to claim 1, wherein the first piston is biased so as to tend to close the outlet by a compression spring.

6. A flow sensor according to claim 1, wherein the transducer comprises a linear variable displacement transducer responsive to the axial position of the first piston with respect to the cylinder.

7. A fuel control system including a flow sensor according to claim 1.

8. A fuel control system according to claim 7, comprising a variable rate pump arranged to supply fuel via the flow sensor.

9. A fuel control system according to claim 8, wherein the variable rate pump is a variable displacement pump.

10. A fuel control system according to claim 8 comprising a controller having an input connected to the flow sensor and an output connected to the variable rate pump for providing servo control of fuel flow.

11. A fuel control system according to claim 8 comprising a pressure raising and shut-off valve disposed between the variable rate pump and the flow sensor.

12. A flow sensor comprising a cylinder:

a first piston movable within the cylinder and dividing the cylinder into first and second chambers, the first chamber communicating with an inlet, the cylinder having an orifice which cooperates with the first piston to define an outlet from the first chamber whose area varies with the position of the first piston within the cylinder, the first piston being biased so as to tend to close the outlet, a pressure varying arrangement for varying the pressure in the second chamber so as to move the first piston to maintain a substantially constant pressure drop between the inlet and the outlet, a transducer for supplying a signal representing the position of the first piston within the cylinder: and the cylinder comprises at least one further orifice which cooperates with the first piston to define at least one further orifice which cooperates with the first piston to define at least one further outlet from the first chamber whose area varies with the axial and rotary positions of the first piston within the cylinder.

13. A flow sensor according to claim 12, comprising a stepper motor or torque motor for rotating the first piston with respect to the cylinder.

14. A flow sensor according to claim 12, comprising means for equalising the pressure drop across the outlet and the or each further outlet.

* * * * *